(12) United States Patent
Hachey

(10) Patent No.: US 6,453,848 B1
(45) Date of Patent: Sep. 24, 2002

(54) ANIMAL GROOMING DEVICE

(76) Inventor: David Hachey, 52 Heather Road, Hamilton, Ontario, L8K 3V8 (CA)

( * ) Notice: Subject to any disclaimer, the term of this patent is extended or adjusted under 35 U.S.C. 154(b) by 0 days.

(21) Appl. No.: 09/702,689

(22) Filed: Nov. 1, 2000

(30) Foreign Application Priority Data

Jul. 14, 2000 (CA) .............................................. 2313909

(51) Int. Cl.[7] .......................... A01K 13/00; A45D 24/22
(52) U.S. Cl. ..................... 119/602; 132/112; 119/603
(58) Field of Search ................................ 119/602, 603, 119/604, 605, 606, 608, 609, 650, 665, 668; 604/313; 132/112

(56) References Cited

U.S. PATENT DOCUMENTS

| | | | | |
|---|---|---|---|---|
| 4,779,572 A | * | 10/1988 | Freulon | 119/604 |
| 5,435,269 A | * | 7/1995 | Chen | 119/668 |
| 5,484,427 A | * | 1/1996 | Gibbons | 119/603 |
| 5,768,748 A | * | 6/1998 | Silvera et al. | 110/602 |
| 5,823,145 A | * | 10/1998 | Hingiss | 119/603 |
| 5,842,441 A | * | 12/1998 | Gjerlov | 119/650 |
| 5,941,859 A | * | 8/1999 | Lerman | 604/313 |
| 6,055,938 A | * | 5/2000 | Klein | 119/606 |
| 6,244,273 B1 | * | 6/2001 | Higgins | 132/112 |

* cited by examiner

Primary Examiner—Charles T. Jordan
Assistant Examiner—Elizabeth Shaw
(74) Attorney, Agent, or Firm—Kramer & Associates, P.C.

(57) ABSTRACT

An animal grooming device comprises pressurized fluid dispensing means and fluid removal means such that pressurized fluid may be directed into and under the hair or fur of an animal and be immediately removed. The fluid removal means may comprise suction means. The device may further comprise a washing head comprising a connector to a source of pressurized fluid, a valve to control the flow of pressurized fluid, at least one fluid dispensing nozzle adapted to direct the pressurized fluid into and under the hair or fur of an animal, and a fluid removal duct connected to the suction means.

14 Claims, 1 Drawing Sheet

ANIMAL GROOMING DEVICE

BACKGROUND OF THE INVENTION

Pets and other domesticated animals often must be washed in order to be properly groomed. Washing always presents problems with messy splashing and water disposal. If the animal is small enough, it maybe washed in a tub with shampoo and water, or hosed down in a suitable room indoors, or else outside where water and splashing will not be a major problem. Larger domesticated animals, such as horses, may be washed indoors or outdoors, but obviously take more time, effort, and water, than smaller animals. Sometimes washing an animal outdoors creates undesirable muddy conditions as excess water runs off the animal or when a hose is turned away from the animal while shampoo is being applied. Washing an animal indoors is often messy since there may be splashing from running water, from the animal shaking, or generally from spray while rubbing the animal with hands or brushes. Running water must flow into a sink or down a floor drain.

Traditional animal washing typically consumes large volumes of water. This can prove costly, particularly when heated water is used, or wasteful, particularly in times of water shortages. In terms of time expended and water usage, traditional animal washing is less than completely efficient. Particularly in commercial animal washing operations, such inefficiencies can be very costly.

Another problem with cleaning animals is the effort required to work shampoo into the fur or coat of the animal. It often takes a good deal of finger action in order to work shampoo deep into the fur of the animal next to the skin. This is difficult for persons with medical conditions of the hands, such as arthritis. It is also more difficult for anyone to accomplish with a single hand, while the other hand holds the animal steady. A person with a physical handicap which restricts the use of one hand, may find it extremely difficult to both keep an animal in a fixed position and massage shampoo into its fur at the same time.

In addition, it is important not to leave the shampoo on an animal's skin or in its fur for an excessive time period since this can cause irritation. Some animals are particularly sensitive to shampoos so the shampoo must be removed completely or not used at all.

Moreover, with traditional animal washing methods, applying treatments to an animal, such as natural or chemical topical medicines, flea control chemicals, skin medicines, or medicinal cleansers, can prove difficult and time consuming. It may take considerable effort to work such compounds into the animal's fur or coat and to have them penetrate to the skin. Then, if they must be removed, a great deal of hosing and brushing may be required to eliminate them.

SUMMARY OF THE INVENTION

Accordingly, it is desirable to have a means to wash an animal which is effective and efficient, causes a minimum of mess, can be operated with one hand, and removes shampoo and wash water. It is desirable to have a device which may be employed for domestic or commercial animal washing.

A device has been created which overcomes the above-listed problems with the prior art.

In a major aspect of the invention, a grooming animal device comprises pressurized fluid dispensing means and fluid removal means such that pressurized fluid may be directed into and under the hair or fur of an animal and be immediately removed.

In further aspects of the invention:
(a) the fluid removal means comprises suction means;
(b) the animal grooming device further comprises a washing head which comprises a connector to a source of pressurized fluid, a valve to control the flow of pressurized fluid, at least one fluid dispensing nozzle adapted to direct the pressurized fluid into and under the hair or fur of an animal, and a fluid removal duct connected to the suction means;
(c) trigger means to selectively open and close the valve;
(d) the fluid removal duct comprises a narrow opening to increase the pressure differential across the opening such that fluid is quickly and efficiently removed;
(e) the device comprises at least three fluid dispensing nozzles;
(f) the nozzle or nozzles comprises a narrow tube to maximize the pressure of the fluid as it is injected into and under the hair or fur of the animal, and to permit the nozzle or nozzles to be inserted under the hair or fur of the animal adjacent the skin of the animal;
(g) the pressurized fluid comprises water and natural or chemical additives;
(h) the additives comprise natural or chemical topical medicines, flea control chemicals, skin medicines, or medicinal cleansers.

Other aspects of the invention which overcome problems in the prior art will become apparent from the following description.

BRIEF DESCRIPTION OF THE DRAWINGS

A preferred embodiment of the invention will now be described in accordance with the following drawings wherein.

DETAILED DESCRIPTION OF THE INVENTION

Figure 1:
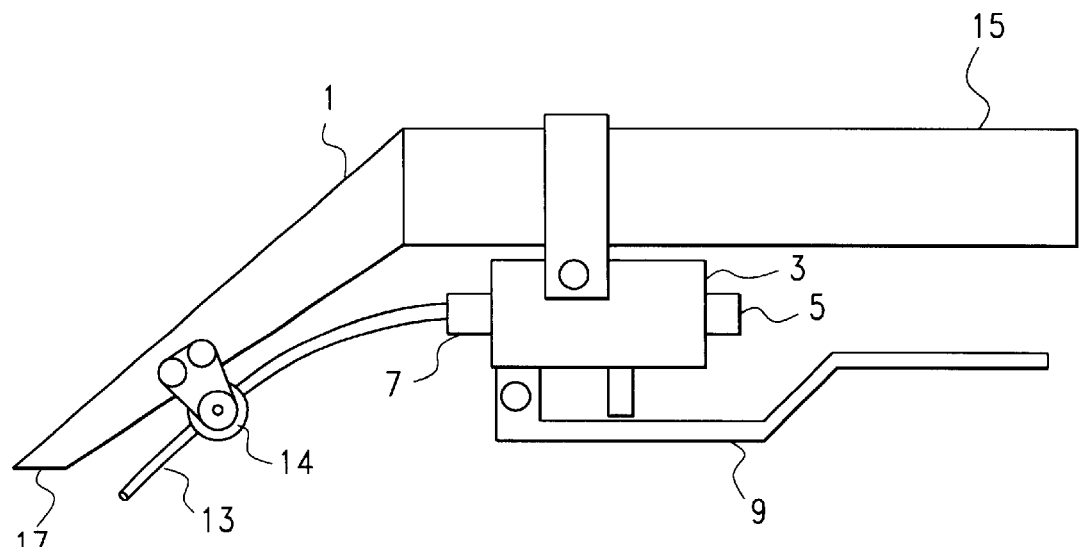
FIG. 1 is a schematic elevation view of the grooming head of the invention.
Figure 2:
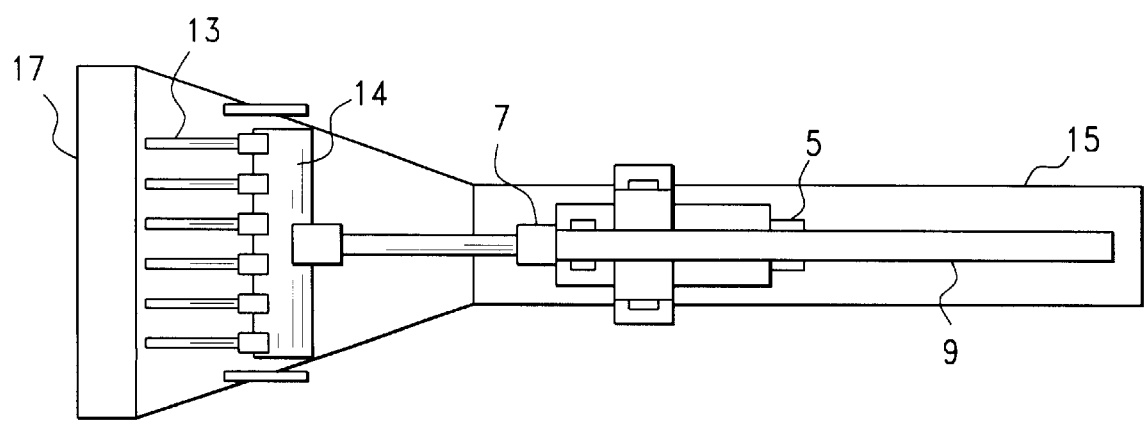
FIG. 2 is a bottom plan schematic view of the grooming head of the invention.

Referring to FIGS. 1 and 2, an animal grooming head 1 comprises a fluid dispensing valve 3 with a fluid intake port 5 and a fluid outlet port 7. Pressurized fluid, typically from a hose or other suitable fluid carrying means, enters the grooming head through fluid intake port 5. Spring-biased trigger 9 can be depressed to allow fluid, normally water, to exit through fluid outlet port 7. Pressurized fluid can be passed through a dispensing means to introduce natural or chemical additives, such as shampoo, medicines, flea treatments, and the like, into the fluid stream. Such dispensing means can permit selective additions of such substances to a stream of pressurized water, in ways well-known in the art. In this way, such substances can be added and then removed from the animal's skin and fur using a stream of clean water.

The pressurized fluid is then directed through an array of dispensing nozzles. These nozzles are typically at the ends of narrow tubes 13 adapted to slide through an animal's fur to get next to its skin. Although a single nozzle will suffice to force fluid close to the animal's skin, an array of three or more nozzles is preferred. In the preferred embodiment, a manifold 14 serves to create a zone of equal pressure so that the pressure of fluid exiting from all nozzles is similar.

A suitable source of air suction, such as a vacuum cleaner (not shown), is connected to vacuum arm 15, thus creating suction at the distal end of arm 15, namely at the vacuum intake opening 17.

Thus, when vacuum is being pulled, fluid ejected from the nozzles 11 can be taken away from the animal's skin and fur at vacuum intake opening 17 to prevent fluid build-up and attendant mess.

A preferred vacuum source is a wet and dry "shop" type vacuum cleaner, since it is designed to take up fluid in its reservoir. Alternatively, a regular dry vacuum system can be used with a suitable trap and drain to divert water from the air stream.

The water supply and vacuum function can be operated independently or together depending upon the circumstances. Warn water can be used when hot and cold taps or other mixing devices are available to control the water supply and temperature. Shampoo can be applied manually or as part of the pressurized fluid stream, as indicated previously. Natural or chemical soaps and cleansers can be used as desired. Similarly, natural or chemical medications or other treatments can be applied manually and washed clean using the device of the invention. These medications and treatments may include topical medicines, flea control chemicals, skin medicines, or medicinal cleansers.

It has been found that use of the device of this invention allows the cleaning of animals using far less water than normally would be required. Reductions to 1/10th to 1/100th of normal water use have been achieved. This saving of both hot and cold water provides the potential for major cost savings and is very environmentally friendly since it requires less heating energy, less water purification, and less burden on water supplies and water treatment facilities.

A preferred embodiment of the invention has been described. Other means to construct the apparatus of the invention, without departing from the spirit and scope of the invention, will be apparent to those skilled in the art.

What is claimed is:

1. An animal grooming device comprising:
   (a) pressurized fluid dispensing means; and
   (b) fluid removal means;
   wherein the fluid dispensing means further comprises a pressurized fluid outlet that is separate and apart from the fluid removal means wherein pressurized fluid may be directed into and under the hair or fur of the animal and be immediately removed.

2. The animal grooming device of claim 1, wherein the fluid removal means comprises suction means.

3. The animal grooming device of claim 2, further comprising a washing head comprising:

(a) a connector to a source of pressurized fluid;
   (b) a valve to control the flow of pressurized fluid;
   (c) at least one fluid dispensing nozzle adapted to direct the pressurized fluid into and under the hair or fur of the animal; and
   (d) fluid removal duct connected to the suction means.

4. The animal grooming device of claim 3, further comprising trigger means to selectively open and close the valve.

5. The animal grooming device of claim 3, wherein the fluid removal duct comprises a narrow opening to increase a pressure differential across the opening such that fluid is quickly and efficiently removed.

6. The animal grooming device of claim 3, comprising at least three fluid dispensing nozzles.

7. The animal grooming device of claim 3 or 6, wherein the nozzle or nozzles comprises a narrow tube to maximize the pressure of the fluid as it is injected into and under the hair or fur of the animal, and to permit the nozzle or nozzles to be inserted under the hair or fur of the animal adjacent the skin of the animal.

8. The animal grooming device of claim 1, wherein the pressurized fluid comprises water.

9. The animal grooming device of claim 8, wherein the pressurized fluid further selectively comprises shampoo.

10. The animal grooming device of claim 8, wherein the pressurized fluid further selectively comprises additives.

11. The animal grooming device of claim 10, wherein the additives comprise natural or chemical topical medicines, flea control chemicals, skin medicines, or medicinal cleansers.

12. The animal grooming device of claim 1, wherein the pressurized fluid is selectively water, or water and shampoo.

13. A method for grooming animals comprising the steps of:
   (a) dispensing pressurized fluid via a fluid dispensing means; and
   (b) removing the fluid via a fluid removing means;
   wherein the fluid dispensing means further comprises a fluid outlet that is separate and apart from the fluid removing means such that the pressurized fluid is directed into and under the hair or fur of an animal and removed via the fluid removing means.

14. The method of claim 1, the method further comprises the step of placing the fluid dispensing means into and under the hair or fur of the animal.

* * * * *

UNITED STATES PATENT AND TRADEMARK OFFICE
CERTIFICATE OF CORRECTION

PATENT NO.   : 6,453,848
DATED        : September 24, 2002
INVENTOR(S)  : David Hachey It is certified that error appears in the above-identified patent and that said Letters Patent is hereby corrected as shown below:

Column 3,
Line 4, delete the number "11" and insert the number -- 13 --
Line 14, delete the word "Warn" and insert the word -- Warm --

Signed and Sealed this

Tenth Day of December, 2002

JAMES E. ROGAN
*Director of the United States Patent and Trademark Office*